United States Patent
Weisz et al.

(10) Patent No.: US 12,053,817 B2
(45) Date of Patent: Aug. 6, 2024

(54) SAND MOLDING FOR METAL ADDITIVE CASTING

(71) Applicant: Magnus Metal Ltd., Tzora (IL)

(72) Inventors: Emil Weisz, Modi'in-Maccabim-Reut (IL); David Scheiner, Savyon (IL); Shimon Sandik, Petach Tikva (IL)

(73) Assignee: Magnus Metal Ltd., Tzora (IL)

( * ) Notice: Subject to any disclaimer, the term of this patent is extended or adjusted under 35 U.S.C. 154(b) by 0 days.

(21) Appl. No.: 18/458,181

(22) Filed: Aug. 30, 2023

(65) Prior Publication Data

US 2023/0405669 A1  Dec. 21, 2023

Related U.S. Application Data

(62) Division of application No. 17/720,335, filed on Apr. 14, 2022, now Pat. No. 11,766,715.

(60) Provisional application No. 63/215,537, filed on Jun. 28, 2021.

(51) Int. Cl.
  *B22D 23/00* (2006.01)
  *B22C 9/02* (2006.01)
  *B33Y 10/00* (2015.01)
  *B33Y 30/00* (2015.01)

(52) U.S. Cl.
  CPC ............... *B22D 23/00* (2013.01); *B22C 9/02* (2013.01); *B33Y 10/00* (2014.12); *B33Y 30/00* (2014.12)

(58) Field of Classification Search
  CPC .......... B22C 9/02; B22D 23/00; B33Y 10/00; B33Y 30/00
  See application file for complete search history.

(56) References Cited

U.S. PATENT DOCUMENTS 10,639,705 B2   5/2020   Fuccio

FOREIGN PATENT DOCUMENTS

| CN | 101449295 A | 6/2009 |
| WO | 2006078342 A2 | 7/2006 |
| WO | 2015019912 A1 | 2/2015 |

OTHER PUBLICATIONS

International Search Report for corresponding application PCT/IL2022/050398 mailed on Sep. 21, 2022.

*Primary Examiner* — Kevin P Kerns
*Assistant Examiner* — Steven S Ha
(74) *Attorney, Agent, or Firm* — HEIDI BRUN ASSOCIATES LTD.

(57) ABSTRACT

A method for casting an object includes additively producing, by a casting system, multiple production layers, one currently-produced production layer after the other. For each currently-produced production layer, the method includes forming, by a mold system of the casting system, one or more mold-layers, providing, by a replaceable material provision system of the casting system, one or more replaceable material layers; and forming, by a molten metal processing of the casting system, one or more current object regions of the currently-produced production layer by providing molten metal that replaces the one or more replaceable material layers.

24 Claims, 19 Drawing Sheets

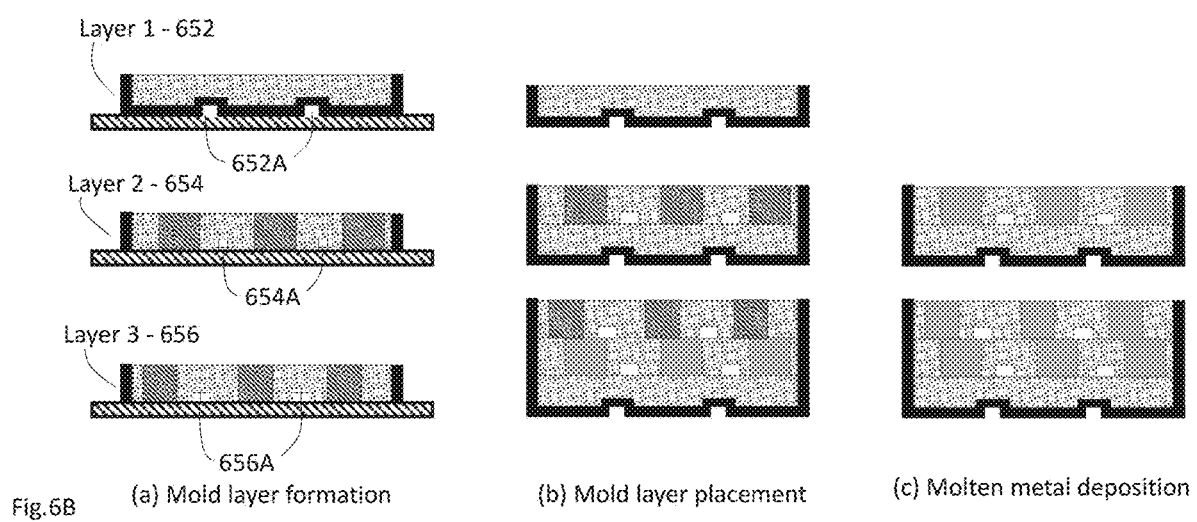
Fig.6B    (a) Mold layer formation    (b) Mold layer placement    (c) Molten metal deposition

SAND MOLDING FOR METAL ADDITIVE CASTING

BACKGROUND OF THE INVENTION

Additive metal casting is a casting process aimed at improving upon traditional casting. Instead of pouring molten metal into a mold in one continuous step, the molten metal is cast in layers. Additive metal casting allows for better control of the solidification process of the part, allowing control of the part's metallurgical properties. The mold is produced step-by-step to allow the casting of the metal by layers. The advantages of additive metal casting include reduced time from design to part fabrication and reduction in the volume of metal required.

The mold for additive metal casting must meet demands that molds for traditional casting are exempt of: Additive metal casting calls for open mold casting, the mold has to withstand several thermal cycles of metal heating, metal casting, and cooling, and a custom mold may be prepared in-situ for the part being cast.

Sand casting is a well know and widely spread technique where sand is used as the mold material. In addition to the sand, a suitable bonding agent (usually clay) is mixed or occurs with the sand. The mixture is moistened, typically with water but sometimes with other substances, to develop the strength and plasticity of the clay and to make the aggregate suitable for molding. The sand is typically contained in a system of frames or mold boxes known as a flask. The mold cavities are created by compacting the sand around models called patterns, by carving directly into the sand, or by 3D printing.

There is a need for additive metal casting means and methods that harness sand molds for efficient casting and fast adoption of additive metal casting by the foundry industry.

SUMMARY OF THE INVENTION

There may be provided a method that may include additively producing, by a casting system, multiple production layers, one currently-produced production layer after the other; wherein for each currently-produced production layer: forming, by a mold system of the casting system, one or more mold-layers; providing, by a replaceable material provision system of the casting system, one or more replaceable material layers; and forming, by a molten metal processing of the casting system, one or more current object regions of the currently-produced production layer by providing molten metal that replaces the one or more replaceable material layers.

There may be provided a non-transitory computer-readable medium for casting an object, wherein the non-transitory computer-readable medium stores instructions for: additively producing, by a casting system, multiple production layers, one currently-produced production layer after the other; wherein for each currently-produced production layer: forming, by a mold system of the casting system, one or more mold-layers; providing, by a replaceable material provision system of the casting system, one or more replaceable material layers; and forming, by a molten metal processing of the casting system, one or more current object regions of the currently-produced production layer by providing molten metal that replaces the one or more replaceable material layers.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 6B schematically depicts metal additive casting using sand molds with grooves in different locations enabling transfer with pronged end-effector, according to embodiments of the present invention.

Figure 1A:
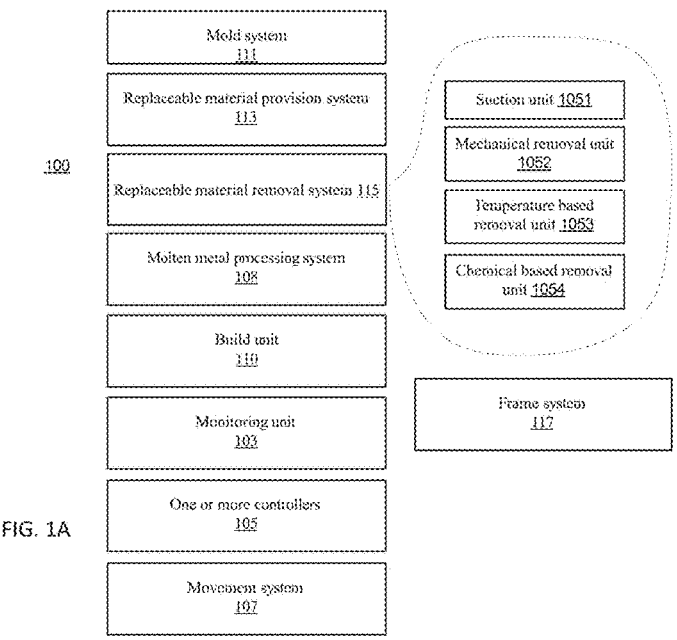
FIG. 1A is an example of a casting system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. The term ex-situ relates herein after to mold preparation outside the metal casting area and the term 'in-situ' relates to mold preparation in the metal casting area.

There may be provided a casting system for casting an object. The casting includes forming one or more mold-layers that are replaced by molten metal.

Referring to FIG. 1A—the casting system may include a mold system 111, a replaceable material provision system 113, a molten metal processing system 108 and a frame system 117. FIG. 1A illustrates additional systems and/or units that may belong to the casting system or may assign in the casting process executed by the casting system. These additional systems and/or units may include a movement system 107, an monitoring unit 103 that may include one or more sensors, a built unit 110, a frame system 117, The casting system is configured to additively produce multiple production layers, one currently-produced production layer after the other. Additively may mean producing one production layer after the other. The formation of one production layer after the other improves the quality of the produced object.

Wherein for each currently-produced production layer:
i. The mold system is configured to form one or more mold-layers. The one or more mold-layers may form one or more patterns.
ii. The replaceable material provision system is configured to provide one or more replaceable material layers.
iii. The molten metal processing system is configured to form one or more current object regions of the currently-produced production layer by providing molten metal that replaces the one or more replaceable material layers.

A replaceable material layer may be replaced when the molten metal is provided. For example, the replaceable material may decompose due to the heat and/or contact with the molten metal.

It may be beneficial to have a replaceable material that may decompose even in the presence of a molten metal that has already started to cool—for example, even following a few minutes from the moment of the deposition of the molten metal—as this may prevent the formation of the non-decomposed replaceable material island within the metal. For example—the replaceable material may dissolve even at temperatures that are below 600 degrees Celsius, at temperatures that exceed 580 degrees Celsius, and the like.

A replaceable material layer may be removed prior to the provision of the molten metal.

The casting system may include a replaceable material removal system 115 that is configured to remove at least one replaceable material layer of the one or more replaceable material layers before a formation of at least one molten metal layer out of one or more molten metal layer that forms the one or more current object regions.

The replaceable material removal system 115 may apply any removal elements illustrated in the specification. For example—the replaceable material removal system 115 may include at least one out of a suction unit 1151, a mechanical removal unit 1152, a temperature-based removal unit 1153 that may apply heating and/or freezing or cooling, a chemical-based removal unit 1154 such as an etching unit, and the like.

The frame system 117 is configured to generate frame regions that define a frame (flask-layer) that delimits the production layer. The frame may be in contact with one or more mold regions.

The frame may be generated by frame system 117. Alternatively—the frame may be generated by a system other than the casting system and positioned, by frame system 117, at a casting location.

One or more frame regions may be obtained (generated or received and placed) per production layer. Alternatively—one or more frame regions may be obtained (generated or received and placed) per multiple production layers.

The frame regions may be made of heat durable material—as the frame regions may be positioned in a vicinity of the molted metal (although the mole regions separate the frame from the molten layer. For example—the frame regions can be made of wood, steel, three-dimensional printable materials, materials that are not three-dimensional printable—and the like.

The replaceable material provision system 113 may be configured to generate one or more replaceable material layers. Alternatively—the replaceable material provision system may be configured to receive the one or more replaceable material layers and to position the one or more replaceable material layers at a casting location.

The mold system 111 may be configured to perform at least one of the following:
i. Dispense mold material to form one or more mold-layers. The mold material may be ceramic mold material.
ii. Form the one or more mold-layers by sand molding.
iii. Form one or more mold-layers that include sand and one or more binding agents.
iv. Form one or more mold-layers that include sand and multiple binding agents. At least two binding agents may differ from each other in their removal process. For example, one may be removed by heat and the other by applying a mechanical removal process.

Examples of replaceable material layers include hardened sand layers that may be removable by one or more from milling, vibration, gas flow, suction, or other mechanical means, compacted sand that may be mechanically removable by one or more from milling, vibration, gas flow, suction or other mechanical means, may be binder hardened sand that may be removable by one or more from heating, milling, vibration, gas flow, suction or other mechanical means and a disposable material configured to be evaporated upon casting the molten metal.

A replaceable material layer may be removed from the mold-layer at least one pattern removal means out of heating, milling, vibration, gas flow, suction, or other mechanical means.

Figure 1B:
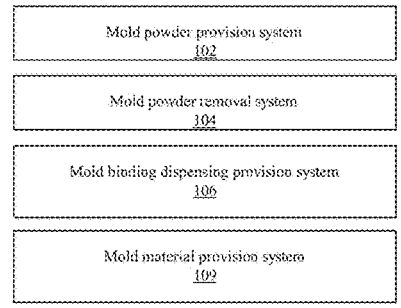
FIG. 1B is an example of a mold system.

The mold system may include a mold powder provision system (denoted 102 in FIG. 1B), a mold binder dispensing system (denoted 104 in FIG. 1B), and a mold powder removal system (denoted 106 in FIG. 1B).

For each currently-produced production layer:
i. The mold powder provision system 102 is configured to provide one or more current mold powder layers.
ii. The mold binder dispensing system 104 is configured to form one or more current mold regions within each of the one or more current mold powder layers by selectively dispensing particles of one or more binding agents that bond some mold powder particles of the current mold powder layer; and
iii. The mold powder removal system 106 is configured to remove mold powder particles located within a certain area of each of the one or more current mold powder layers, the certain area is defined by at least some of the one or more current mold regions.

The metal processing system 108 may be configured to perform at least one out of:
i. Form the one or more current object regions of the currently-produced production layer by depositing molten metal at cavities created in the mold-layer, applying at least one of pre-deposition treatment and post-deposition treatment.
ii. Form the one or more current object regions of the currently-produced production layer by depositing molten metal at cavities created in the mold-layer, applying at least one of pre-deposition treatment and post-deposition treatment such that the pre-deposition and post-deposition treatment comprises heating, wherein the deposition unit, pre-deposition treatment unit and post-deposition unit are physically coupled and share a common movement arrangement (referred herein as Preparation and Deposition and Post (PDP) treatment). (in other words, applying a Preparation and Deposition and Post (PDP) treatment for replacing the one or more replaceable material layers).
iii. Apply (as a part of the PDP treatment) the preparation, the deposition and the post-treatment in a local manner. Local manner—may be within an area of up to a few centimeters width or length.
iv. Apply (as a part of the PDP treatment) at least two of the preparation, the deposition, and the post-treatment in a spatially distributed manner. Spatially distributed may mean at a distance of more than 10 or 20 centimeters.
v. Perform a heating an environment of the current object regions. The environment may span more than 10 centimeters from the location of the deposition of molten metal.

The monitoring unit 103 may be configured to monitor one or more aspects of the casting process executed by the casting system. For example, monitoring unit 103 may monitor the operations of one or more of mold system 111, replaceable material provision system 113, replaceable material removal system 115, molten metal processing system 108, frame system 117, and movement system 107.

The monitoring unit 103 includes one or more sensors of one or more types—passive sensor, active sensor, light sensor, infrared sensor, vibration sensor, movement sensor, torque sensor, accelerometer heat sensor, x-ray sensor, electron beam sensor, ion beam sensor, spectroscope, and the like.

The monitoring unit 103 may include one or more processors for processing sensed information and provide alerts, suggestions on how to amend any aspect of the casting process, and the like.

For example—monitoring unit 103 (or one or more controller 105 that may be external to the monitoring unit) may be configured to control the providing of the one or more replaceable material layers based on the monitoring.

Figure 1C:
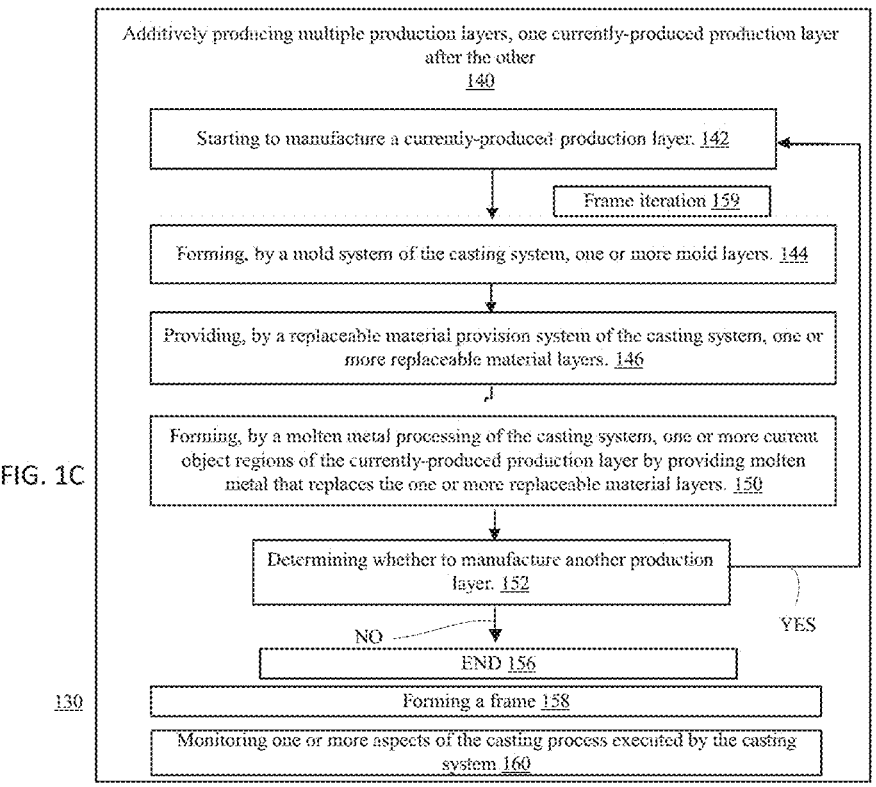
FIG. 1C is an example of a method.

FIG. 1C is an example of method 130 for casting an object.

Method 130 may include step 140 of additively producing multiple production layers, one currently-produced production layer after the other.

Step 140 may include steps 142, 144, 146, and 150.

Step 142 may include starting to manufacture a currently-produced production layer wherein for each currently-produced production layer:

Step 142 may be followed by step 144 of forming, by a mold system of the casting system, one or more mold-layers.
i. Dispensing mold material to form the one or more mold-layers. The mold material may be ceramic mold material.
ii. Forming the one or more mold-layers by sand molding.
iii. Forming the one or more mold-layers that include sand and one or more binding agents.
iv. Forming one or more mold-layers that include sand and multiple binding agents. At least two binding agents may differ from each other in their removal process. For example—one may be removed by heat and the other by applying a mechanical removal process.
v. Forming the one or more mold-layers by a mold system that may include a mold powder provision system, a mold binder dispensing system, and a mold powder removal system.
vi. For each currently-produced production layer: (i) providing, by a mold powder provision system, one or more current mold powder layers, (ii) forming, by a mold binder dispensing system, one or more current mold regions within each of the one or more current mold powder layers by selectively dispensing particles of one or more binding agents that bond some mold powder particles of the current mold powder layer; and (iii) removing, by a mold powder removal system, mold powder particles located within a certain area of each of the one or more current mold powder layers, the certain area is defined by at least some of the one or more current mold regions.

Step 144 may be followed by step 146 of providing, by a replaceable material provision system of the casting system, one or more replaceable material layers.

Step 146 may include generating, by the replaceable material provision system, the one or more replaceable material layers.

Alternatively, step 146 may include receiving, by the replaceable material provision system, the one or more replaceable material layers and positioning the one or more replaceable material layers at a casting location.

Step 146 may be followed by step 150 of forming, by a molten metal processing of the casting system, one or more current object regions of the currently-produced production layer by providing molten metal that replaces the one or more replaceable material layers.

Step 150 may include at least one out of:
i. Forming the one or more current object regions of the currently-produced production layer by applying a Preparation and Deposition and Post (PDP) treatment for replacing the one or more replaceable material layers.
ii. Applying (as a part of the PDP treatment) the preparation, the deposition, and the post treatment in a local manner. Local manner—may be within an area of up to a few centimeters width or length.

iii. Applying (as a part of the PDP treatment) at least two of the preparation, the deposition, and the post-treatment in a spatially distributed manner. Spatially distributed may mean at a distance of more than 10 or 20 centimeters.

iv. Heating an environment of the current object regions. The environment may span more than 10 centimeters from the location of the deposition of molten metal.

A replaceable material layer may be replaced when the molten metal is provided—for example, it may decompose due to the heat and/or contact with the molten metal.

It may be beneficial to have a replaceable material that may decompose even in the presence of a molten metal that has already started to cool—for example, even following a few minutes from the moment of the deposition of the molten metal—as this may prevent the formation of the non-decomposed replaceable material island within the metal. For example—the replaceable material may dissolve even at temperatures that are below 600 degrees Celsius, at temperatures that exceed 580 degrees Celsius, and the like.

Step 150 may be followed by step 152 of determining whether is a need to manufacture another production layer—and if so, jumping to step 142—else ending the formation of the production layers—as indicated by END step 156.

Method 130 may include step 158 of forming a frame. The forming of the frame may be executed per production layer—and in this case, step 158 may include multiple iterations 159, and during each iteration, one or more frame regions (related to a production layer) are formed—and each iteration 159 be executed between step 142 and step 144. Alternatively—the forming of the frame may include forming one or more frame regions once per multiple production layers. Yet, for another example—the frame may be formed once per object.

Method 130 may also include step 160 of monitoring one or more aspects of the casting process executed by the casting system—for example monitoring steps 144 and/or 146 and/or 150. The monitoring step may provide one or more monitoring results. The monitoring results may be the sensed information or an outcome of processing the sensed information.

The monitoring may be executed by a monitoring unit 103 that may include one or more sensors of one or more types—passive sensor, active sensor, light sensor, infrared sensor, vibration sensor, movement sensor, torque sensor, accelerometer heat sensor, x-ray sensor, electron beam sensor, ion beam sensor, spectroscope, and the like.

The monitoring results may include alerts, suggestions on how to amend any aspect of the casting process, and the like.

Step 160 may include controlling any aspect of the casting process based on one or more of the monitoring results. For example—step 160 may include controlling the providing of the one or more replaceable material layers based on the monitoring.

Figure 1D:
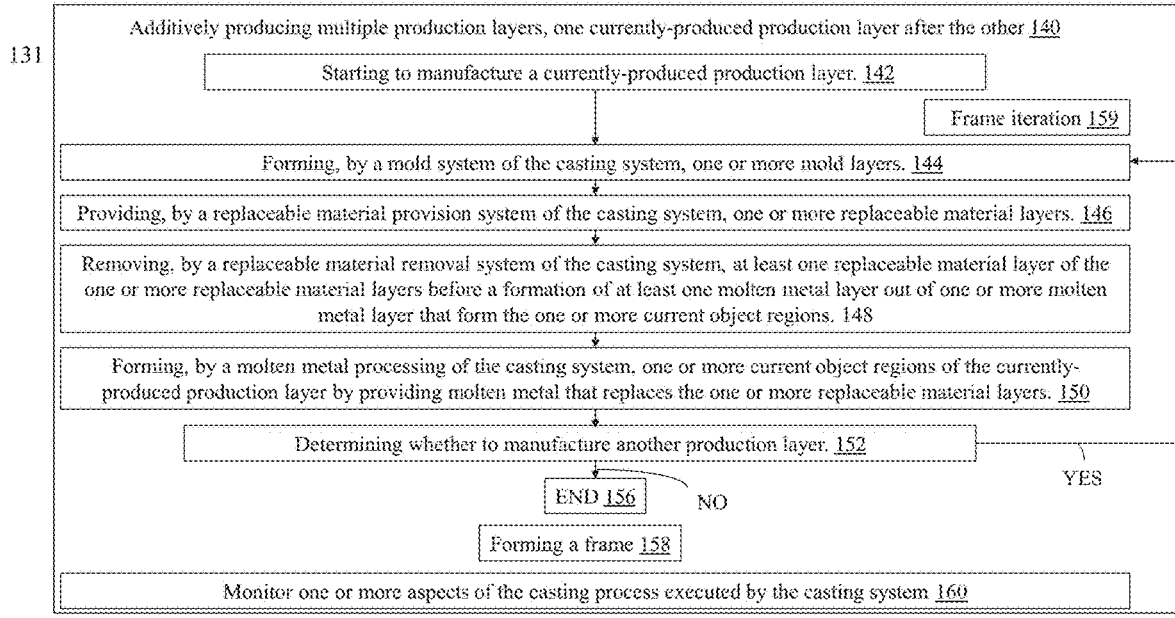
FIG. 1D is an example of a method.

FIG. 1D is an example of method 131 for casting an object.

Method 131 may include step 140 of additively producing multiple production layers, one currently-produced production layer after the other.

Step 140 may include step 142 of starting to manufacture a currently-produced production layer wherein for each currently-produced production layer.

Step 142 may be followed by step 144 of forming, by a mold system of the casting system, one or more mold-layers.

Step 144 may be followed by step 146 of providing, by a replaceable material provision system of the casting system, one or more replaceable material layers.

Step 146 may be followed by step 148 of removing, by a replaceable material removal system of the casting system, at least one replaceable material layer of the one or more replaceable material layers before a formation of at least one molten metal layer out of one or more molten metal layer that forms the one or more current object regions.

Step 148 may be executed by at least one of a suction unit, a mechanical removal unit, a temperature-based removal unit, or a chemical-based removal unit.

Step 148 is followed by step by step 150 of forming, by a molten metal processing of the casting system, one or more current object regions of the currently-produced production layer by providing molten metal that replaces the one or more replaceable material layers.

Step 150 may be followed by step 152 of determining whether is a need to manufacture another production layer—and if so, jumping to step 142—else ending the formation of the production layers—as indicated by END step 156.

Method 131 may include step 158 of forming a frame. The forming of the frame may be executed per production layer—and in this case, step 158 may include multiple iterations 159, and during each iteration, one or more frame regions (related to a production layer) are formed—and each iteration 159 be executed between step 142 and step 144. Alternatively—the forming of the frame may include forming one or more frame regions once per multiple production layers. Yet, for another example—the frame may be formed once per object.

Method 131 may also include step 160 of monitoring one or more aspects of the casting process executed by the casting system.

Mold regions of a layer may form a pattern. For example—sand molds may be used with embedded pattern objects.

The removing operation may be executed by a chemical-based removal unit.

The one or more replaceable material layers may be decomposable in the presence of the molten metal.

The method may include generating, by the replaceable material provision system, the one or more replaceable material layers.

The method may include receiving, by the replaceable material provision system, the one or more replaceable material layers and positioning the one or more replaceable material layers at a casting location.

The method may include forming, by the mold system, the one or more mold-layers by sand molding.

The one or more mold-layers may include sand and one or more binding agents.

The one or more mold-layers may include sand and binding agents, wherein at least two of the binding agents differ from each other by their removal process.

For each currently-produced production layer, the method may include providing, by a mold powder provision system of the mold system, one or more current mold powder layers; forming, by a mold binder dispensing system of the mold system, one or more current mold regions within each of the one or more current mold powder layers by selectively dispending particles of one or more binding agents that bond some mold powder particles of the current mold powder layer; and removing, by a mold powder removal system of the mold system, mold powder particles located within a certain area of each of the one or more current mold powder layers, the certain area is defined by at least some of the one or more current mold regions.

For each currently-produced production layer, the method may include dispensing, by the mold system, mold material to form one or more mold-layers.

The method may include forming, by the metal processing system, the one or more current object regions of the currently-produced production layer by applying a Preparation and Deposition and Post (PDP) treatment for replacing the one or more replaceable material layers.

The operation of applying the PDP treatment may include applying the preparation, the deposition, and the post-treatment in a local manner.

The operation of applying the PDP treatment may include applying at least two of the preparation, the deposition, and the post-treatment in a spatially distributed manner.

The method may include performing, by the metal processing system, a heating an environment of the current object regions.

The method may include monitoring by a monitoring unit, the providing of the one or more replaceable material layers.

The method may include controlling, by a controller, the providing of the one or more replaceable material layers based on the monitoring.

The one or more replaceable material layers are configured to be decomposed at temperatures that exceed 590 degrees Celsius.

The one or more replaceable material layers are configured to be decomposed at temperatures that the molten layer reaches up to a few minutes from deposition.

The method may include generating, by a frame system of the casting system, frame regions that define a frame that encloses one or more mold regions.

There may be provided a method for forming a mold for additively casting of a metal object comprising preparing a mold-layer comprising at least one removable pattern embedded in the mold-layer, positioning the mold-layer at a casting location, casting molten metal into at least one casting pattern object, removing the at least one embedded removable casting pattern in the mold-layer and replacing it with the molten metal and repeating the previous steps with at least one additional mold-layer, wherein the at least one additional mold-layer is placed on top of a previous mold-layer.

In some embodiments, at least one of the mold-layers is formed by sand molding.

In some embodiments, at least one casting pattern is formed by embedding a pattern object into the mold-layer before or concurrently with the forming of the mold-layer by sand molding.

In some embodiments, at least one pattern object is made of at least one from the list consisting: loose sand within the hardened sand mold-layer that is removable by one or more from milling, vibration, gas flow, suction, or other mechanical means, compacted sand that is mechanically removable by one or more from milling, vibration, gas flow, suction or other mechanical means, and binder hardened sand that is removable by one or more from heating, milling, vibration, gas flow, suction or other mechanical means and a disposable material configured to be evaporated upon casting the molten metal.

In some embodiments, at least one pattern object is removed from the mold-layer prior to the casting of the cast material. In some further embodiments the at least one pattern object is removed from the mold-layer by at least one from the list of pattern removal means consisting of heating, milling, vibration, gas flow, suction or other mechanical means.

In some embodiments, the at least one pattern object is removed from the mold-layer during the casting of the casted material.

In some embodiments, the mold-layer is prepared by filling a mold-layer frame with sand and hardening the sand with a hardening material.

In some embodiments, the method further comprises, prior to filling the mold-layer frame with sand, positioning the at least one casting pattern object in a pattern object's respective location in the mold-layer frame.

In some embodiments, the positioning of the at least one additional mold-layer on top of the previous mold-layer is done using alignment means comprising recesses and or protrusions.

According to an aspect of the invention, the proposed embodiment of the invention consists of a multi-step additive molten metal casting process where layers of sand molds are used with embedded pattern objects. According to another aspect of the invention, In one embodiment, the mold-layer may be a full uniform sand mold-layer, and the mold openings may be made by the removal of the sand from the mold-layer in the form of the object, for example, by milling, without the use of a pattern object. The casting process may be for one part or may be implemented for multiple parts in the mold.

Dedicated software may receive a computer-aided design (CAD) file of a part and may produce a representation of a stack of layers that, when stacked on each other, form the designed part. Each layered section of the designed part ("pattern object") may be embedded in casting sand, thereby forming a mold-layer that is open on top and may be open or closed at the bottom (except the first layer, which can be closed at the bottom). The pattern object which may be embedded in each layer may be made of various removable or sacrificial or disposable materials, including polystyrene, sand, or other materials. The pattern object may be created by additive deposition, either directly in the mold-layer or printed externally and placed in the mold-layer. Multiple pattern objects may be embedded in each layer. The mold-layer may be formed within a frame, which aids in the rigidity of the mold-layer, especially when transfer of the mold-layer is required (also referred to herein as a flask-layer). The mold-layer may be created on a previous mold-layer in the casting area or on a separate build table. The mold-layer may be made using casting sand with bonding agents, as is known in the art.

The pattern object areas may act as supports between parts of the mold area, preventing reduced rigidity, which could otherwise be caused by pattern holes in the mold-layer. In certain cases, especially for a sufficiently rigid structure with small pattern areas, the embedded pattern area may be left empty of material.

Figure 2A:
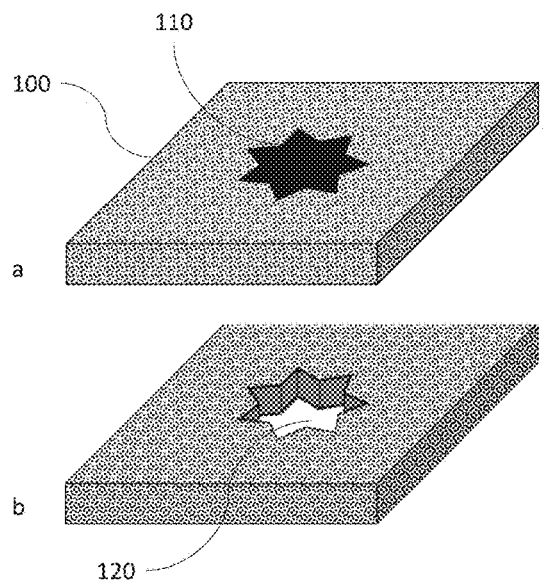
FIG. 2A depicts embedded pattern area before and after removal of the pattern object, according to embodiments of the present invention.

A first mold-layer may be formed or placed in the casting location, an optional pattern object removal step is performed, creating a casting pattern, and then the mold is filled by pouring a molten metal layer. A second mold-layer may be formed ex-situ or in-situ, or placed on top of the previous metal-filled mold-layer, then an optional pattern object removal step may be performed, creating a casting pattern, and then the mold may be filled with a second molten metal layer. Additional cycles of mold-layers and cast layers may be performed. Reference is made to FIG. 2A, which depicts a mold-layer with a pattern object in it (a) and after removal of the pattern object (b).

In one embodiment, the mold-layer may be produced in situ, on the same build table used for fabricating the cast layers. An advantage of this embodiment may be that this mold-layer need not be transferred; therefore the mechanical constraints imposed on its rigidity may be lower compared with a mold-layer prepared in a separate location. Further, the in-situ building can adjust to imperfections of the previous layer (e.g., excess/missing material).

In another embodiment, the mold-layer may be produced ex-situ, in a separate location from the location used for casting, moved to the casting build table, and placed in the appropriate place, for example, on top of the preceding mold-layer. The presence of an embedded pattern object layer in the mold-layer is an advantage in providing additional rigidity for enabling of transfer of the mold-layer. An advantage of this embodiment may be the much lower temperature ex-situ of the building of the mold-layer. In order to ensure sufficient accuracy in the alignment of a new mold-layer with respect to its previous one, the new mold-layer may be pre-heated before it is placed on its previous one in order to minimize differential expansion effects associated with a temperature difference between the layers.

In one embodiment, the first, i.e., bottom, mold-layer may be a full layer without an embedded pattern object area. The full first mold-layer may act as a bottom cover for the subsequent mold-layers. The bottom mold-layer may be formed without binder material, with a top surface containing binder material, or with fully binder containing material.

In one embodiment, the first, i.e., bottom, mold-layer may be filled with sand to a partial height prior to placing or forming embedded pattern object areas. The partially filled first mold-layer may act as a bottom cover for the subsequent mold-layers. The bottom mold-layer may be formed without binder material, with a top surface containing binder material or with fully binder-containing material.

In one embodiment, a mold-layer may be formed with both mold area and pattern object area made of sand, whereby the mold-layer is completely filled with sand. The mold area may be formed by binder-coated sand placed selectively or by selective binder coating of the sand in the mold area or by additive deposition with sand. The embedded pattern object area may be formed by compacted sand, or by binder coated sand or by selective binder coating of the sand, where the binder material in the pattern object area is of different characteristics from the binder material of the mold area. The binder-coated sand may be hardened by heating or by the flow of an activating gas or other means. The binder material may consist of hardening materials from a list comprising: types of clay, types of silicates, types of resins, types of oil, or others. The pattern object may be created by additive deposition with sand, either directly in the mold-layer or printed externally and placed in the mold-layer. The embedded pattern object area may be formed in the mold-layer before or concurrently with the forming of the mold area by sand molding.

Figure 2B:
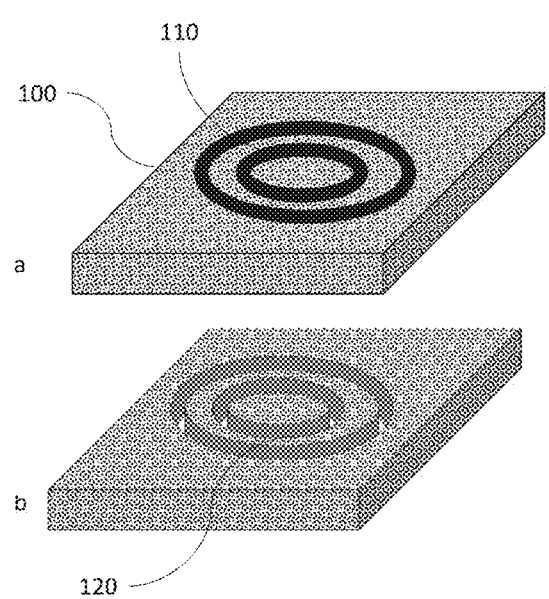
FIG. 2B depicts concentric embedded pattern areas before and after removal of the pattern object, according to embodiments of the present invention.

A further advantage of forming a mold-layer with the embedded patterned object(s) retained during placement in the casting area is that it enables creating mold patterns that otherwise cannot be transferred without the embedded pattern. Reference is made to FIG. 2B, which depicts a mold-layer with pattern objects in it (a) and after removal of the pattern objects (b). As depicted, for example, a mold-layer with a pattern consisting of concentric rings to be cast with metal cannot be transferred as one piece if the mold-layer is formed without retaining the embedded pattern. Without the embedded patterns, multiple mold parts would need to be transferred and placed accurately in the casting area. Leaving the embedded pattern objects in place enables transferring the mold-layer as one continuous part.

In some embodiments, the removed pattern object may be adapted for additional casting cycles and, as such, may be transferred to the mold preparation location in order to be re-used. In some embodiments, the cycle of removal and transfer to the mold preparation location may be done automatically by adequate means.

Figure 2C:
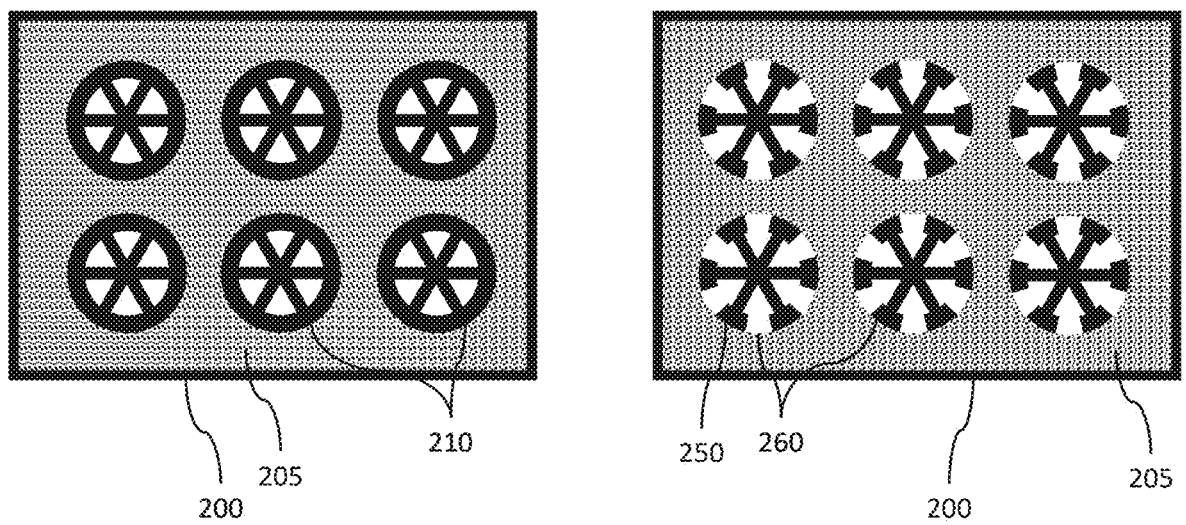
FIG. 2C depicts embedded pattern areas with open areas in the pattern, according to embodiments of the present invention.

In one embodiment, illustrated in FIG. 2C, the embedded pattern object area 210 in a mold-layer 200, aimed for the fabrication of a round metal shape, may be binder coated selectively. For example, the mold-layer 200 is formed with both mold area 205 and pattern area 210 made of sand, whereby the mold-layer 200 is completely filled with sand. The pattern area 210 may be formed by binder-coated sand placed selectively or by selective binder coating of the sand in the mold area. The applied pattern area 250 acts as support between parts of the mold area 205, enabling sufficient rigidity for the transfer of the mold-layer 200 from the mold-layer fabrication area. In certain cases, especially for a sufficiently rigid structure, the embedded pattern area may be left partially empty of material.

Upon removal of the loose sand (that is, the sand that is not forming part of the mold area 205 and the pattern area 260), cavities 260 are created. Areas 250 and 260 together construct the round object area to be deposited. When molten metal is deposited into areas 250 and 260, easier subsequent removal of the pattern object by decomposition is achieved.

According to another embodiment, the embedded pattern area may be formed by compacted sand, or by binder coated sand or by selective binder coating of the sand, where the binder material in the pattern area (e.g., areas 210 shown in FIG. 2) is of different characteristics from the binder material of the mold area (e.g., areas 205 shown in FIG. 2). For example, the binder-coated sand in areas 205 may be solidified by heating or by the flow of an activating gas or other means, while the material in areas 210 is decomposed.

In one embodiment, binder decomposition of the embedded pattern object may be used, followed by removal of the sand from the pattern area, creating a casting pattern. In another embodiment, the embedded pattern object may be made of compacted sand, which may be extracted by mechanical means or which may be (crumbled/decomposed) by milling, vibration, gas flow, or other mechanical means prior to removal of the sand, where the mold area sand is resistant to the mechanical means. The removal of the sand may be performed by vacuum suction. After removal of the embedded pattern object, the mold-layer may also undergo additional process steps to increase the strength of the mold-layer prior to casting of molten metal.

In one embodiment, the mold-layer may be a full uniform sand mold, and the mold openings may be made by the removal of the sand from the mold-layer in the form of the object, for example, by milling, without the use of a pattern object.

The decomposition of the binder material in the embedded pattern area may be performed by general heating of the sand mold, local heating of the sand in the embedded pattern areas, local illumination of the sand in the embedded pattern areas, by the flow of a decomposing gas or liquid or other methods. During decomposition and after decomposition, the sand in the embedded pattern areas may be removed by vacuum suction or by a combination of compressed gas flow and vacuum suction.

In one embodiment, the sand in the embedded pattern area is decomposed above a certain temperature, lower than the decomposition temperature of the binder material of the mold area. A local pattern object removal module may heat the sand in the pattern area with a heating unit, for example, by use of a pipe supplying heated gas or by use of an irradiating heating unit. The local pattern object removal module may contain a vacuum suction unit that is operated in the embedded pattern area and extracts the decomposed sand and other residues from the surface of the exposed preceding mold-layer and cast layer. The heating unit and vacuum suction unit may work simultaneously to enable gradual layer-by-layer removal of the sand (the removal layer may be different from a mold-layer and typically much thinner than the mold-layer). The local pattern object removal module may repeatedly scan the embedded pattern area in various motion patterns, including a raster pattern, a contour following a pattern, or other options.

In one embodiment, the sand in the embedded pattern area may be decomposed when exposed to illumination at certain wavelengths and/or intensities, whereas the binder material of the sand in the mold area is less sensitive to the illumination. The local pattern object removal module may contain an illumination unit instead of the heating unit, and the illumination unit may work in conjunction with the vacuum suction unit. The illumination unit and vacuum suction unit may work simultaneously to enable gradual layer-by-layer removal of the sand (the removal layer may be different from a mold-layer and typically much thinner than the mold-layer). The local pattern object removal module may repeatedly scan the embedded pattern area in various motion patterns, including a raster pattern, a contour following pattern or other options. The illumination source may be a laser, an array of lights (lamps, LEDs), or others.

The decomposition step may be carried out under local sub-pressure conditions to accelerate the vertical flow of fumes emitted possibly from the embedded pattern areas in order to minimize possible contamination of the underlying metal surface. The decomposition step may be carried out in the presence of a gas that readily reacts with possible emissions from the embedded pattern areas in order to minimize possible contamination of the underlying metal surface. After removal of the sacrificial (e.g., sand) in the embedded pattern area, creating a casting pattern, molten metal may be poured into the casting pattern. The next mold-layer may then be placed on top of the previous mold-layer and the process is repeated. After completion of the casting of all the layers, the stack of mold-layers with at least one cast part is placed in a mold removal station, the sand is removed, and the at least one part is retrieved.

Figure 3:
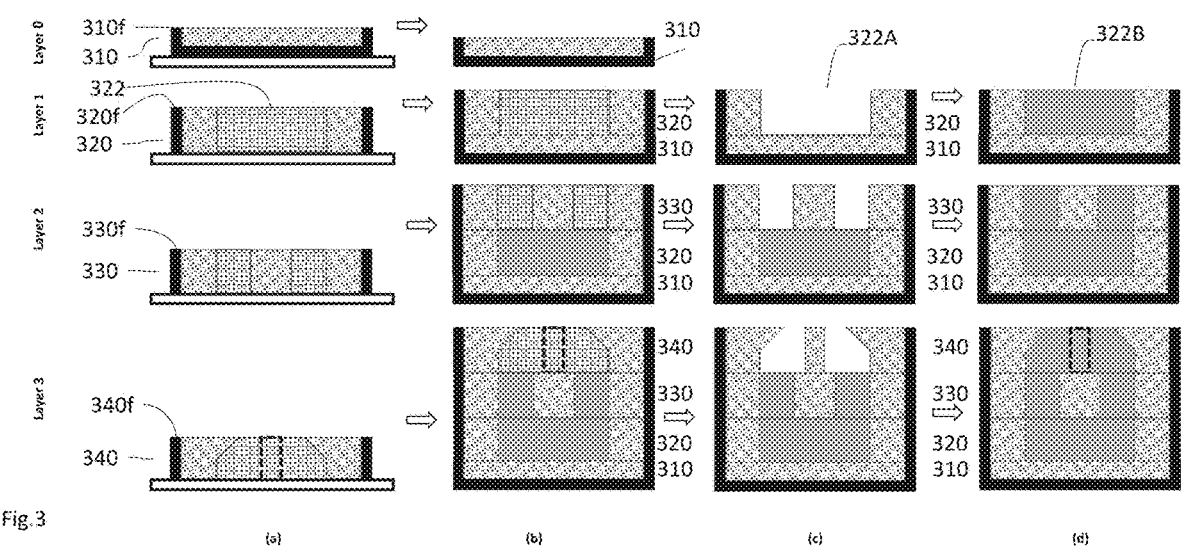
FIG. 3 schematically presents metal additive casting using sand molds with sand based embedded areas and ex-situ mold-layer formation, according to embodiments of the present invention.

FIG. 3, 3A, 3B, 3C, to which reference is now made, depict a layer-by-layer metal additive casting using sand mold-layers with sand-based embedded areas. FIG. 3 schematically presents metal additive casting using sand mold-layers with sand-based embedded areas and ex-situ mold-layer formation, according to embodiments of the present invention. In the embodiment illustrated in FIG. 3, metal additive casting may include the following steps for each layer (310-340): (a) a sand-based embedded pattern (net hatched) (e.g., 322) may be formed in a frame (flask layer) (black, solid) (310/-340f, respectively) on a build table (possibly except for the first layer) surrounded by casting sand (dotted); (b) a newly prepared mold-layer may be transferred to the casting area and be placed on top of the previously casted mold-layer; (c) sand-based patterns may be removed (e.g., 322A) and (d) metal (grey, solid) is cast to fill the embedded pattern (e.g., 322B). The process may be repeated for as many layers as needed.

Figure 3A:
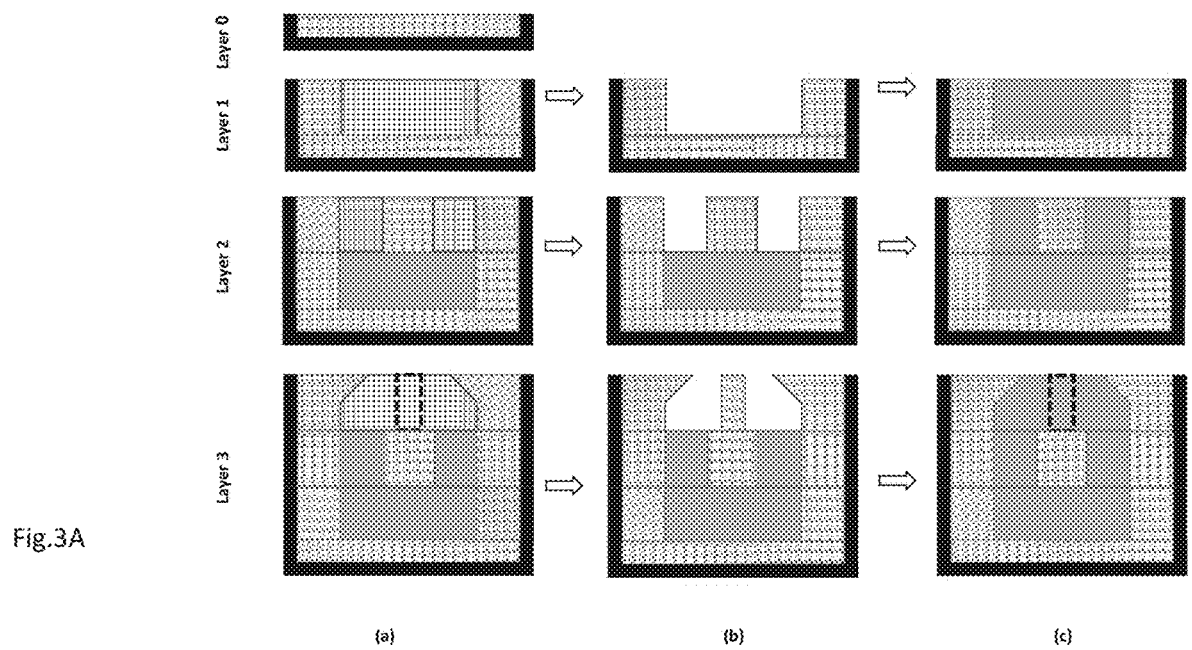
FIG. 3A schematically presents metal additive casting using sand molds with sand based embedded areas and in-situ mold-layer formation, according to embodiments of the present invention.

FIG. 3A, to which reference is now made, depicts a layer-by-layer molding and casting of three separate layers and a bottom layer exploiting metal additive casting using sand molds with sand-based embedded areas and in-situ mold-layer formation, according to embodiments of the present invention. In the embodiment illustrated in FIG. 3A, metal additive casting may include the following steps for each layer: (a) a mold-layer frame with one or more embedded sand-based patterns (net hatched) embedded in the sand-based mold (dotted) formed in a frame (flask layer) (black, solid) in the casting area (possibly except for the first layer); (b) the sand-based pattern(s) may be removed (solid white) and (c) metal (grey, solid) is cast to fill the embedded pattern(s). The process may be repeated for as many layers as needed.

Figure 3B:
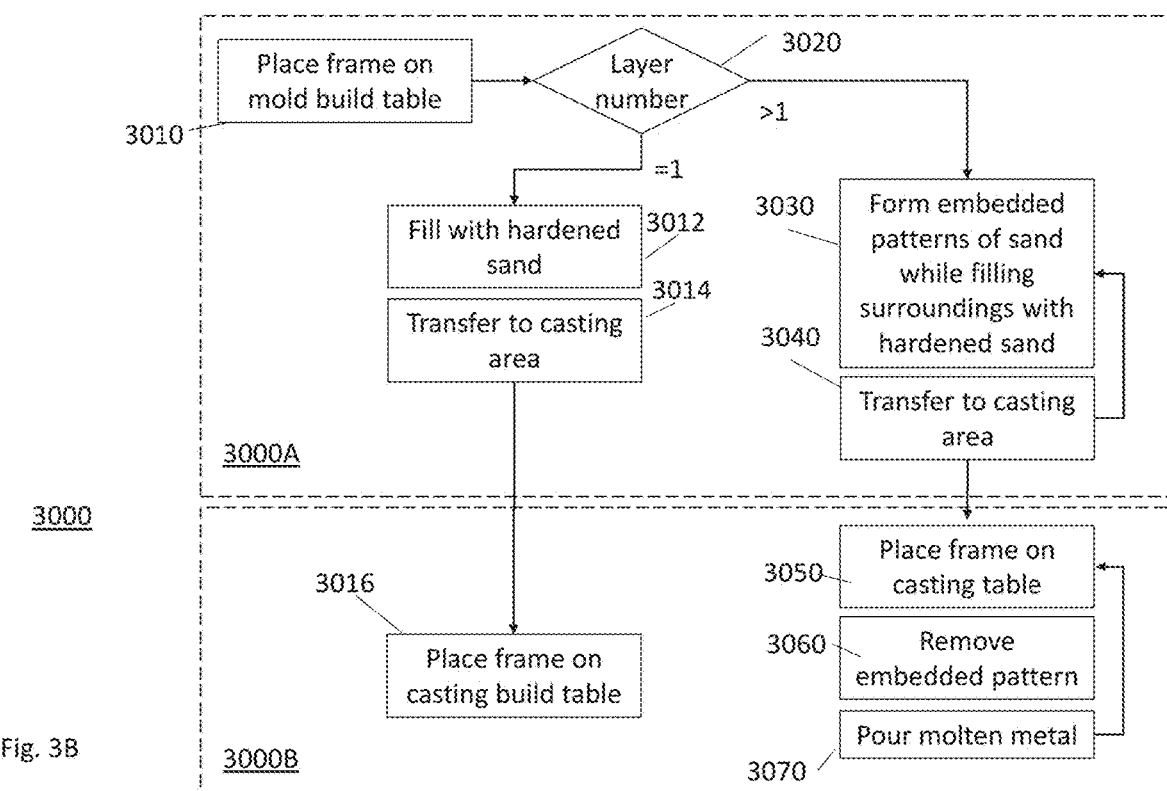
FIG. 3B is a flowchart of an embodiment described in FIG. 3, according to embodiments of the present invention.

FIG. 3B, to which reference is now made, is a flowchart of an additive casting process 3000 carried out, e.g., as illustrated in FIG. 3, according to embodiments of the invention. Additive casting process 3000 is partially performed in the mold preparation site 3000A and partially performed in the casting site 3000B. Additive casting process 3000 may begin in mold preparation site 3000A by placing a mold-layer frame on a mold-layer build table (step 3010). If the mold-layer is the first (step 3020, layer=1), the frame may be filled by casting sand (step 3012) and then transferred to the casting site (step 3014) and placed on the casting location in the casting build table (step 3016). If the process relates to any other mold-layer (as determined in step 3020) after its frame is placed on the build table (3010), a step of pattern object(s) formation/placement may take place, the area surrounding the formed/placed pattern objects may be filled with hardened sand (step 3030), and the prepared mold-layer may be transferred to the casting site (step 3040). At the casting site, the mold-layer may be placed on the appropriate location, for example, on top of the previous mold-layer on the casting build table (step 3050), and the embedded pattern objects may be removed (step 3060); and molten metal may then be poured into one or more cavities created by the mold-layer (step 3070). Steps 3030-3040 may be repeated for each consecutive mold-layer at the mold preparation site 3000A, and steps 3050-3070 may respectively be repeated for each such consecutive mold-layer at the casting site 3000B.

Figure 3C:
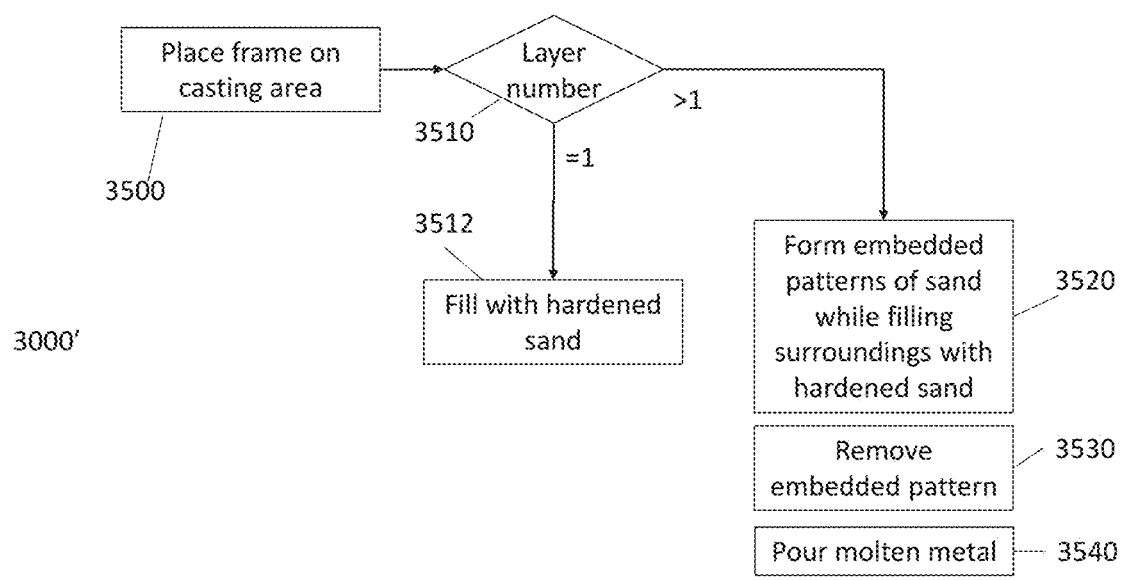
FIG. 3C is a flowchart of an embodiment described in FIG. 3A, according to embodiments of the present invention.

FIG. 3C, to which reference is now made, is a flowchart of additive casting process 3000' carried out, e.g., as illustrated in FIG. 3A, according to embodiments of the invention. Additive casting process 3000' may entirely be performed on the casting site. Process 3000' may begin by placing a mold-layer frame on the casting area (step 3500). If the mold-layer is the first (step 3510, layer=1), the frame may be filled by casting sand (step 3512). If the process relates to any other mold-layer (as determined in step 3510), a step of pattern object(s) forming/placing may take place, and the area surrounding the placed pattern objects may be filled with hardened sand (step 3520); embedded patterns may be removed from the mold-layer (step 3530), and molten metal may then be poured into the mold-layer (step 3540).

In one embodiment, a mold-layer is formed where the mold area is made of sand, and the embedded pattern area is made of a sacrificial/disposable material. The mold area may be formed by binder-coated sand placed selectively or by selective binder coating of the sand in the mold area or by compaction of sand. The embedded pattern area may be formed by polystyrene or other organic material or other inorganic material that decomposes at high temperatures or upon contact with the molten metal.

Figure 4:
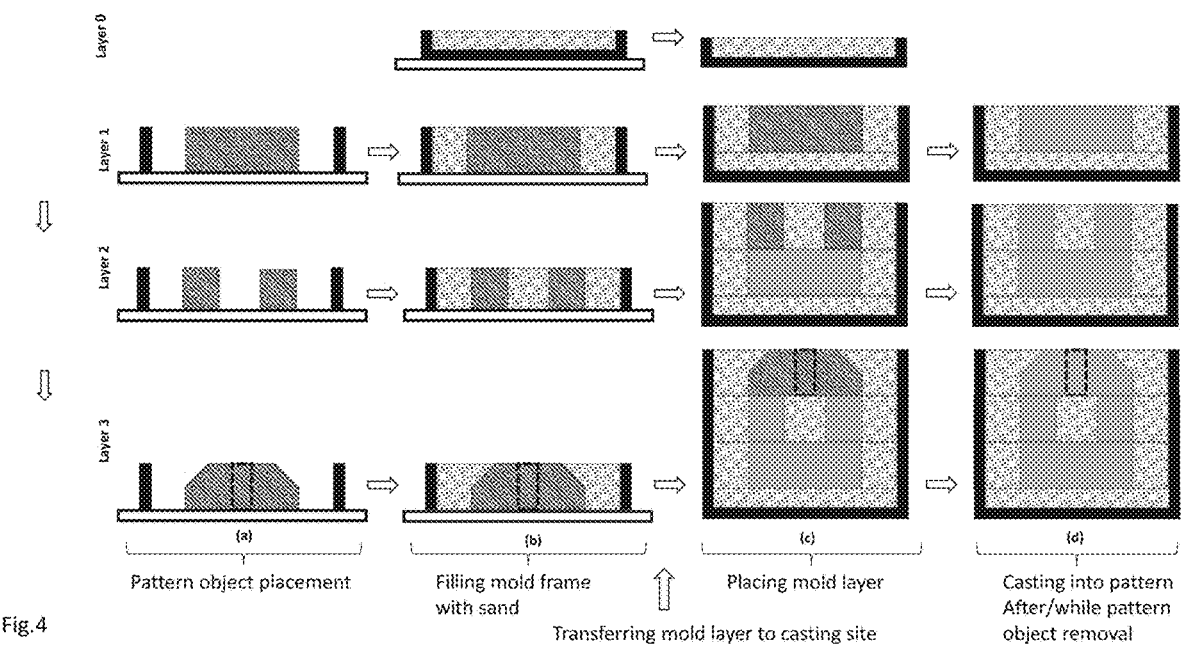
FIG. 4 schematically presents metal additive casting using sand molds with sacrificial embedded areas and ex-situ mold-layer formation, according to embodiments of the present invention.

FIG. 4, to which reference is now made, depicts a layer-by-layer molding and casting of three separate layers and a bottom layer exploiting metal additive casting using sand molds with sacrificial embedded areas and ex-situ mold-layer formation. Metal additive casting may include the following steps for each layer: (a) a sacrificial embedded pattern (diagonal, hatched) is placed or formed in a layer frame (flask layer) (black, solid) on a build table (possibly except for the first layer); (b) the vacancy in the mold-layer frame is filled with casting sand (dotted); (c) the newly prepared mold-layer is transferred to the casting area and placed on top of the previously casted mold-layer; and (d) molten metal (grey, solid) is cast by pouring to decompose and replace the embedded pattern. The process may be repeated for as many layers as needed. This example demonstrates solid features (Layer 1), horizontal channels (Layer 2), vertical shafts (Layer 3, black line, dashed), and sub-layer features and undercuts (Layer 3). according to embodiments of the present invention.

Figure 4A:
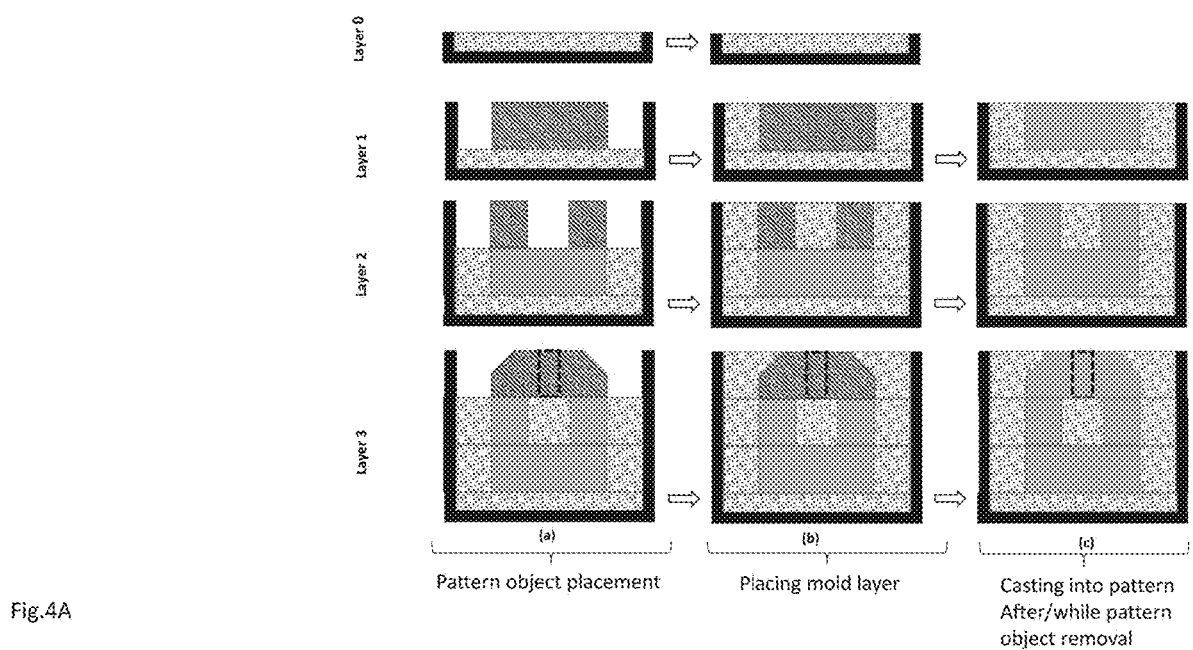
FIG. 4A schematically presents metal additive casting using sand molds with sacrificial embedded areas and in-situ mold-layer formation, according to embodiments of the present invention.

FIG. 4A, to which reference is now made, depicts a layer-by-layer molding and casting of three separate layers and a bottom layer exploiting metal additive casting using sand molds with sacrificial embedded areas and in-situ mold-layer formation, according to embodiments of the present invention. Metal additive casting may include the following steps for each layer: (a) a sacrificial embedded pattern (diagonal, hatched) is placed or formed in a layer frame (flask layer) (black, solid) on a casting build table (not shown) in the casting area (possibly except for the first layer); (b) the vacancy in the layer frame is filled with casting sand (dotted); (c) molten metal (grey, solid) is cast by pouring to decompose and replace the embedded pattern. The process may be repeated for as many layers as needed. This example demonstrates solid features (Layer 1), horizontal channels (Layer 2), vertical shafts (Layer 3, black line, dashed), and sub-layer features and undercuts (Layer 3).

Figure 4B:
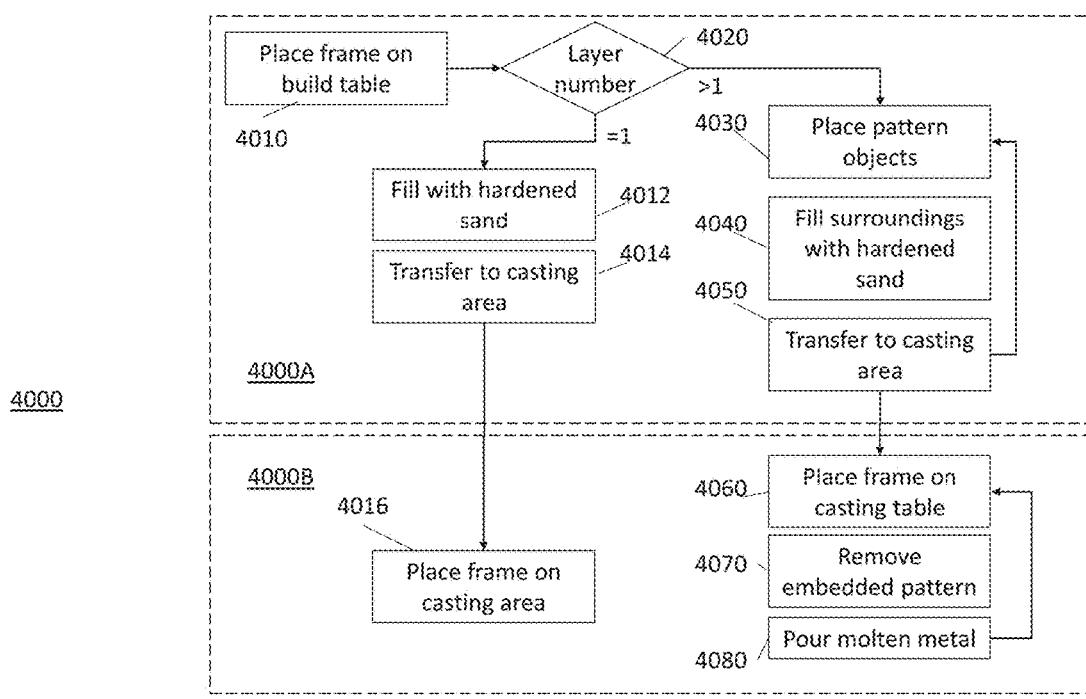
FIG. 4B is a flowchart of an embodiment described in FIG. 4 according to embodiments of the present invention.

FIG. 4B, to which reference is now made, is a flowchart of additive casting process 4000 carried out e.g., by the embodiment described in FIG. 4, according to embodiments of the present invention. Additive casting process 4000 is partially performed in the mold preparation site 4000A and partially performed in the casting site 4000B. Additive casting process 4000 may begin in mold preparation site 4000A by placing a mold-layer frame on the mold build table (step 4010). If the mold-layer is the first (step 4020, layer=1), the layer frame may be filled by casting sand (step 4012) and then be transferred to the casting site (step 4014) and be placed on the casting location in the casting site (step 4016). If the process relates to any other mold-layer (as determined in step 4020), after the respective layer frame is placed on the mold build table (4010), a step of pattern object(s) placement or formation may take place (step 4030), the area surrounding the placed pattern objects may be filled with hardened sand (step 4040) and the prepared mold-layer may be transferred to the casting site (step 4050). At the casting site, the mold-layer may be placed on the previous mold-layer on the casting build table (step 4060), the embedded pattern objects may be removed (step 4070), and molten metal may then be poured into the mold-layer (step 4080). Steps 4070 and 4080 may take place simultaneously, whereby pouring molten metal onto the embedded pattern causes the pattern to decompose or evaporate. Steps 4030-4050 may be repeated for each consecutive mold-layer at the mold preparation site 4000A, and steps 4060-4080 may respectively be repeated for each such consecutive mold-layer at the casting site 4000B.

Figure 4C:
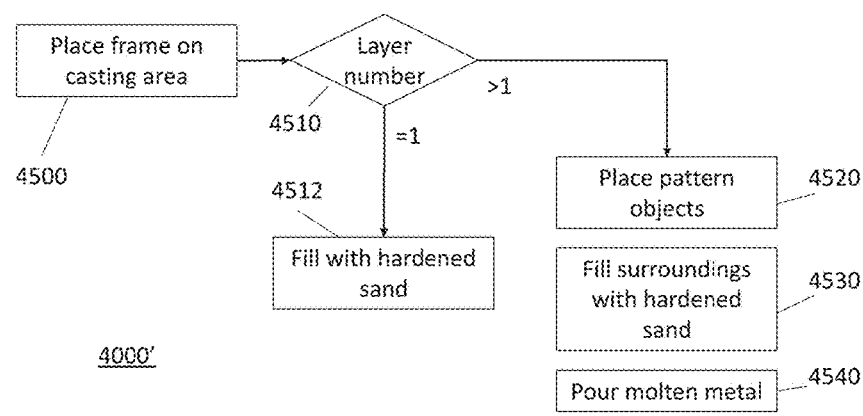
FIG. 4C is a flowchart of molding process 4000' of an embodiment described in FIG. 4A, according to embodiments of the present invention.

FIG. 4C, to which reference is now made, is a flowchart of additive casting process 4000' carried out e.g., in accordance with the embodiment described in FIG. 4A, according to embodiments of the present invention. Additive casting process 4000' may entirely be performed on the casting site. The additive casting process 4000' may begin by placing a mold-layer frame on the casting build table (not shown) in the casting area (step 4500). If the mold-layer is the first (step 4510, layer=1), the layer frame may be filled by casting sand (step 4512). If the process relates to any other mold-layer (as determined in step 4510), a step of pattern object(s) placement or formation may take place (step 4520), the area surrounding the placed pattern objects may be filled with hardened sand (step 4530) and molten metal may then be poured into the mold-layer (step 4540), whereby the molten metal decomposes or evaporates the embedded pattern.

In one embodiment, the parts consisting of the embedded pattern area may be placed or formed in a location(s) by a pattern object placement unit within a required placement accuracy. For example, the placement accuracy may be 0.5 mm or less. The surrounding mold area in the mold-layer is then filled with sand, where the sand optionally contains binder material, and the sand is treated by compaction or heat or by the flow of an activating gas to become rigid, whereby the mold-layer is completely filled with material.

In one embodiment, the embedded pattern object material is covered with a coating capable of withstanding high temperatures and preserving the surface quality of the embedded pattern object, thus providing a smoother surface finish than the sand mold. In a specific embodiment, the embedded pattern object is coated with an investment casting slurry prior to the formation of the sand mold.

The formation of the sand mold-layer may be performed in situ on top of a previously cast sand mold-layer or ex-situ, in a separate location. In the case of ex-situ mold production, the mold-layer is transferred and placed on the previous layer. In the case of in-situ mold production, the next mold-layer is produced on top of the existing mold-layer. Once the current mold-layer is in place, the molten metal is poured into the embedded pattern area, and the embedded pattern object decomposes and evaporates. The next mold-layer is then placed (if produced ex-situ) or formed (if produced in-situ) on top of the previous mold-layer, and the process is repeated. After completion of the casting of all the layers, the stack of mold-layers with at least one cast part is placed in a mold removal station, the sand is removed, and the at least one part is retrieved.

In one embodiment, an adhesive material is applied to at least part of the bottom of the mold-layer prior to placement on the previous mold-layer. The adhesive layer may be applied during the initial placing of the sand in the mold area of the mold-layer, or the adhesive material may be applied externally to the bottom of the mold-layer prior to placement in the casting area.

The mold material may be formed to a height greater than the height of the mold-layer frame. The excess height may protrude above and/or below the layer frame. After placing a mold-layer on a preceding mold-layer, pressure may be applied to the top surface of the mold-layer to facilitate compacting and merging of the interface between the layers. The excess height may be in the range of 0.1 mm to 1 mm. The pressure may be applied by a plate positioned on top of the mold-layer being placed.

In one embodiment, clamps may be applied to the layer frames to hold them in place during the molten metal casting process.

The mold-layer may be formed with recesses and protrusions on the top, and bottom surfaces acting as connections and alignment means between the layers. The formation of recesses and protrusions enables alignment between the sequential mold-layers and prevents horizontal shift between mold-layers. The location for placement of the mold-layers on the casting area may be aligned differently as required for parts of different shapes. Multiple sets of features may be located on the surface of the casting area to enable the first mold-layer to be affixed in various positions depending on the dimensions and layout of the embedded pattern objects within the mold frame.

In one embodiment, the recesses and protrusions may be located in the layer frame surrounding the mold-layer (flask layer). The recesses and protrusions implemented in the frame part of the mold-layer construct connections that may be utilized as alignment elements between the build table and the mold frame and between consecutive mold-layers.

Figure 5:
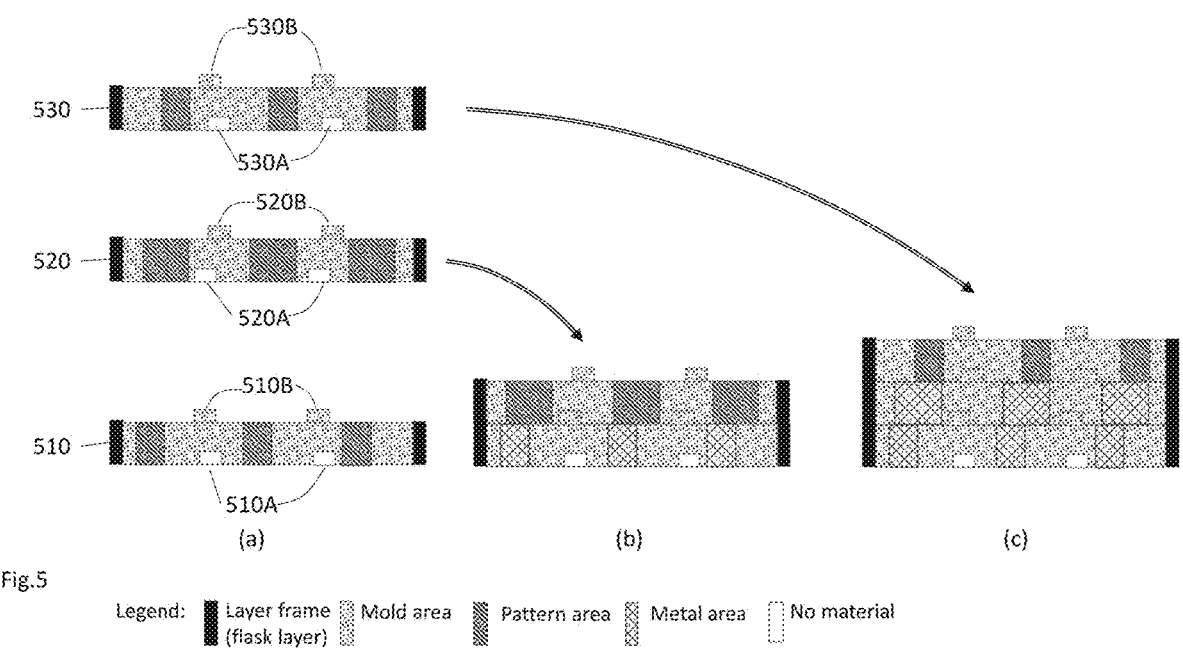
FIG. 5 schematically presents use of recesses and protrusions for connecting between mold-layers, according to embodiments of the present invention.

FIG. 5, to which reference is now made, depicts the use of recesses and protrusions for accurate placement and alignment of mold-layer to mold-layer, according to embodiments of the invention. The use of protrusions and recesses is demonstrated by three mold-layers 510, 520, and 530. Recesses 510A and protrusions 510B may be prepared at the bottom and on the top (respectively) of mold-layer 510. Similarly, recesses and protrusions may be prepared at the bottom and on the top (respectively) of mold-layers 520 and 530, so that the recesses of one mold-layer match the sizes and locations of respective protrusions of its previous mold-layer. View (a) presents each of mold-layers 510-530 separately during their fabrication. View (b) depicts the placement of mold-layer 520 on top of mold-layer 510 after metal deposition step of layer 510. View (c) depicts the placement of mold-layer 530 on top of mold-layer 520 after the consecutive metal deposition step of layer 520.

Figure 5A:
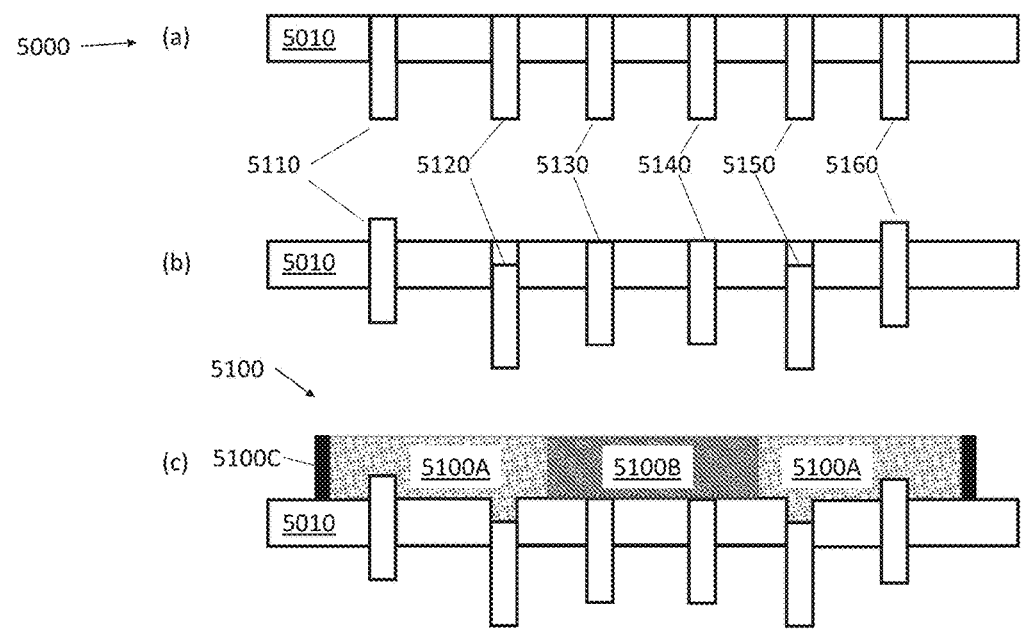
FIG. 5A schematically depicts a device for forming protrusions and or recesses at the bottom of a mold-layer, according to embodiments of the present invention.

FIG. 5A, to which reference is now made, schematically depicts device 5000 for forming protrusions and or recesses at the bottom of a mold-layer, according to embodiments of the present invention. Device 5000 may comprise a plurality of displaceable pins 5110-5160 disposed in a plate plane (also referred to herein as a table) 5010 so that each of pins 5110-5160 may be moved up from the upper side of table 5010 to form a protrusion or be moved down from the upper side of table 5010 to form a recess. A combination of recesses and protrusions may be formed by a combination of plates. The pins and holes may be round, oval, or other possible shapes. In the example of FIG. 5A pins 5110 and 5160 were moved to form protrusions from plate 5010, and pins 5120 and 5150 were moved to form recesses at the top of plate 5010. When plate 5010 is placed at the bottom of mold-layer 5100, pins 5110 and 5160 form recesses in the mold-layer, and pins 5120 and 5150 form protrusions in the mold-layer. It will be noted that in the example of FIG. 5A, recesses and protrusions are formed only in the sand portions 5100A of mold-layer 5100, while the area of plate 5010 that faces the bottom of the molded part 5100B remains flat. Recesses may be formed on the top of a mold-layer by creating areas without binder material that are subsequently removed by suction or similar means. Protrusions may be formed on the top of a mold-layer by forming rigid sand. In some embodiments, the moving of pins 5110-5160 (which pin will be moved in which direction and to what extent) may be controlled by a controller that may be adapted to provide movement control signals to respective actuators (not shown).

In one embodiment, pins of device 5000 are used to form protrusions on the bottom of the mold-layer, and recesses are formed on the top of the mold-layer by creating areas without binder material that are subsequently removed by suction or similar means.

In another embodiment, the connections between mold-layers may consist of rigid sand parts of the mold area. Additionally or alternatively, the connections between mold-layers may be supplementary parts inserted into a recess in a first mold-layer, bonding thereto, whereupon when connecting a second mold-layer to the first mold-layer, the additional parts fit into matching recesses in the second mold-layer, bonding thereto. A combination of connections in the frame and in the sand-filled areas may be used. The location of the connections may vary from layer to layer in accordance with the shape of the embedded parts in the layers.

In one embodiment, the supplementary parts inserted may contain adhesive material that forms a rigid bond between the sequential mold-layers. The material may be sand mixed with a binding material and/or an adhesive material.

In one embodiment, the recesses on the top and/or bottom surfaces may be formed by creating areas without binder material added to the sand, whereby the loose sand may be removed to create the cavities forming the recesses.

In one embodiment, the recesses are formed at the bottom of the mold-layers, and protrusions are formed on the top of the mold-layers. The recesses may be formed by creating areas without binder material in the bottom of the mold area that decomposes easily when the mold-layer is lifted off the build table. The location and shape of the recesses are aligned with protrusions on the top of the preceding mold-layer. The protrusions on top of the layer are formed in the mold area with the location and shape of the protrusions aligned with recesses in the subsequent mold-layer. In a specific embodiment, the inner surface of the recesses may contain material with properties enabling adhesion when coming into contact with the protrusions of the previous layer.

The mold-layer bottom surface may be formed with sunken grooves to enable insertion of pronged mechanical robotic end effectors for lifting from, and placing on, flat surfaces, e.g., by a suitable forklift-like device. The sunken grooves may be created in areas between cast regions in the mold-layers. In one embodiment, the sunken grooves on the bottom surface are formed by creating areas without binder material added to the sand, whereby the loose sand may be removed to create the required cavities. The location of the sunken grooves may be varied depending on the shape of the embedded pattern object of the layer, thus, the relative end-effector position for transfer from the mold-layer preparation site to the casting site may vary accordingly.

In one embodiment, the sunken grooves are of a tapered shape for use with a tapered shape of pronged end effectors to enable insertion into the groove with minimal friction between the prongs and the groove, whereby contact is made essentially only when the robotic end effectors reach their full insertion position.

In one embodiment, the sunken grooves are formed by placing hollow bars on the build table prior to filling with sand. After filling the mold-layer, the pronged end effector is inserted into the hollow bars, and the mold-layer is transferred to the casting area by lifting the mold-layer with the hollow bars. In a further embodiment, the hollow bars are of an external tapered shape in the horizontal direction. In addition, the inside cavity of the hollow bars may also be of a tapered shape in the horizontal direction. When placing the mold-layers on the casting area, the pronged end effectors may be easily removed from the mold-layers while extracting the hollow bars.

Figure 6A:
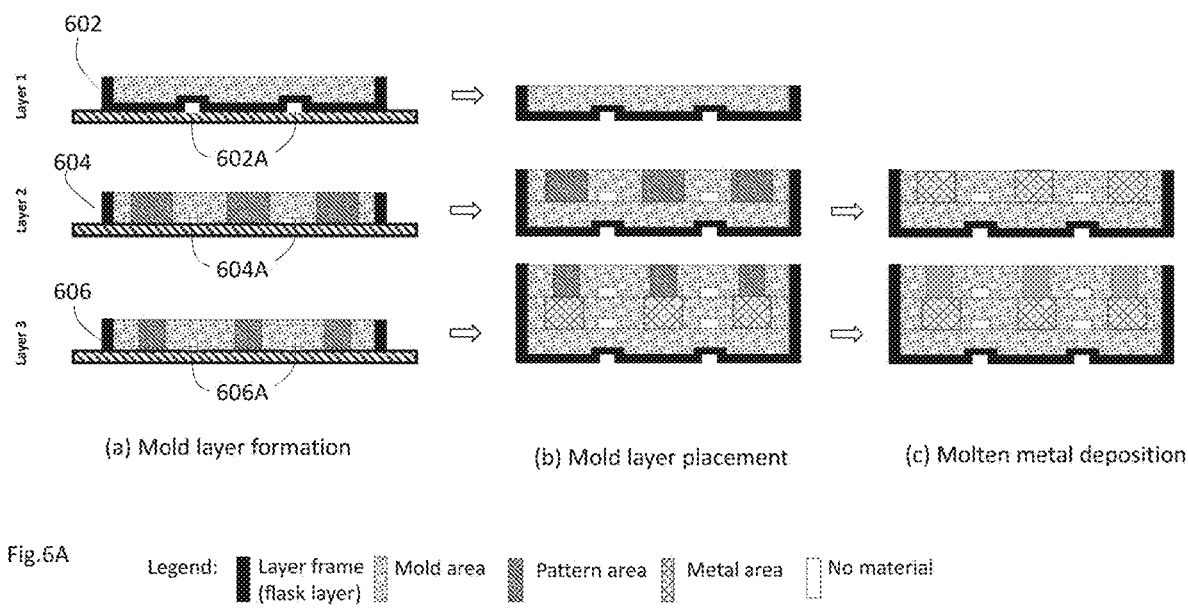
FIG. 6A schematically depicts metal additive casting using sand molds with grooves enabling transfer with pronged end-effector, according to embodiments of the present invention.

FIGS. 6A and 6B, to which reference is now made, present forming grooves for transferring mold-layers, in different positions at the bottom of the mold-layers. The grooves may be made by removable sand, by raised bars in device 5000 illustrated in FIG. 5A, by the placement of hollow bars, or by pre-placement of pronged end-effectors, according to embodiments of the present invention. FIG. 6A presents a case in which grooves 602A-606A for transferring the mold-layers 602-606, respectively, are made in the same locations at the bottom of all the mold-layers. FIG. 6B presents a case in which grooves 652A-656A for transferring the mold-layers 652-656, respectively, are made in the different locations at the bottom of the mold-layers. In FIGS. 6A and 6B, the casting stages are marked (a)—forming a mold-layer, (b)—placing a mold-layer on top of its previous mold-layer, and (c)—casting (removing of pattern object(s) and pouring molten metal).

Figure 7:
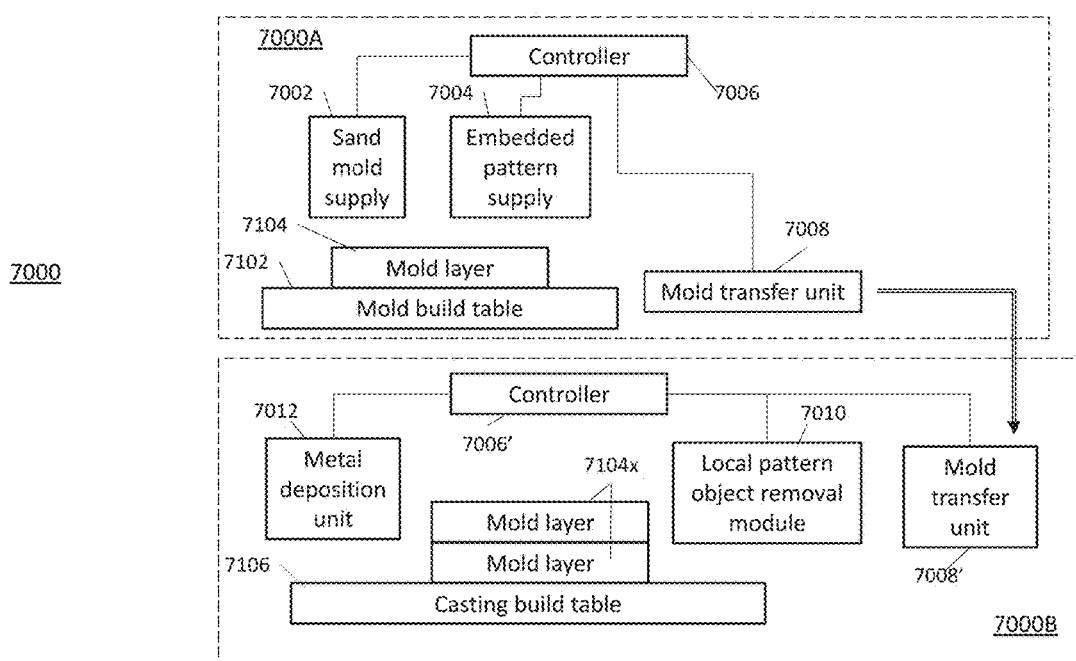
FIG. 7 schematically describes a system for preparing mold-layers in a mold preparation site, transfer them to molding site and using them for molding an object, according to embodiments of the present invention.

In order to carry out the methods of casting and molding described herein, a system may be formed. Reference is made now to FIG. 7, which schematically describes additive casting system 7000 for preparing mold-layers in a mold preparation site, transferring them to a casting site, and using them for casting an object, according to embodiments of the present invention. FIG. 7 describes additive casting system 7000, which comprises molding sub-system 7000A and casting sub-system 7000B, which may be disposed remotely from each other. It will be apparent to those skilled in the art that sub-systems 7000A and 7000B may be utilized for molding and casting in a single site, with obvious required changes.

Molding sub-system 7000A may comprise sand mold supply unit 7002 adapted to controllably supply sand to a mold-layer 7104 during the mold-layer preparation stage. Molding sub-system 7000A may further comprise unit 7004 for supplying pattern object(s) to the prepared mold-layer. A mold-layer in preparation may be placed on a mold build table 7102. When preparation of mold-layer 7104 is finished, it may be transferred by mold-layer transfer unit 7008 to casting site 7000B. In some embodiments, some or all of the units of sub-system 7000A may be controlled and timed by the control unit 7006. Control unit 7006 may comprise any suitable controller, programmable logic control (PLC), or any other computing unit adapted to execute controller readable program code. The program code may be stored on a non-transitory computer-readable storage unit (not shown), as is known in the art.

Casting sub-system 7000B may comprise a pattern object removal unit 7010 and molten metal deposition unit 7012. The placement of a mold-layer in the casting location (e.g., accurately on top of a previous mold-layer on the casting build table 7106) may be done by transfer-and-place unit 7008'. Once the placement of the mold-layer is complete (or, after the completion of optional preparatory steps, not shown), molten metal is poured by metal deposition unit 7012 into one or more cavities created in mold-layer 7104.

The operation and timing of units 7010, 7012, and 7008' may be done by the control unit 7006'. Control unit 7006' may comprise any suitable controller, programmable logic control (PLC) or any other computing unit adapted to execute controller readable program code. The program code may be stored on a non-transitory computer-readable storage unit (not shown), as is known in the art.

In some embodiments, mold transfer unit 7008 and mold transfer-and-place unit 7008' may be a single unit, depending inter alia on the distance between the two sites. In some embodiments, controller 7006 and controller 7006' may be a single controller, depending inter alia on the distance between the two sites.

Figure 8:
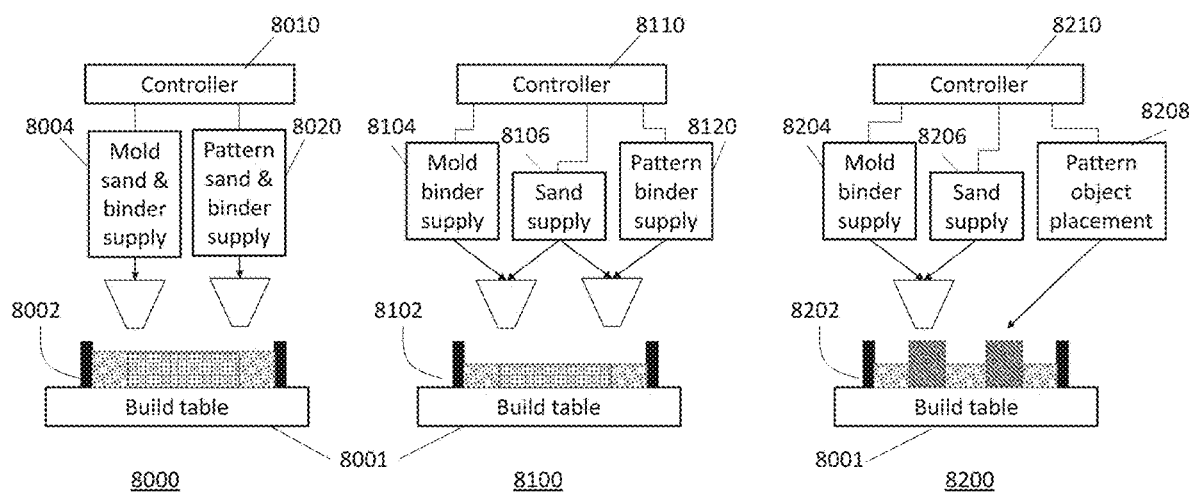
FIG. 8 schematically presents three different mold-layer preparation systems, according to embodiments of the present invention.

Preparation of a mold-layer according to embodiments may be done in different ways. Reference is made now to FIG. 8, which schematically presents three different mold-layer preparation systems, 8000, 8100, and 8200, according to embodiments of the invention. Mold-layer preparation system 8000 may comprise mold sand and binder supply unit 8004 and pattern object sand and binder supply unit 8020 disposed above the mold-layer frame 8002, adapted to provide sand and binder material for preparing pattern object(s) (unit 8020) and for filling the remaining mold-layer frame with sand and binder material for forming the mold (unit 8004). The operation of units 8020 and 8004 may be controlled by controller 8010.

Mold-layer preparation system 8100 may comprise mold binder supply unit 8104, sand supply unit 8106, and pattern binder supply unit 8120. Controller 8110 may control the operation of units 8104, 8106, and 8120 to provide the right mixture for pattern object(s) and the right mixture for the mold at the desired locations.

Mold-layer preparation system 8200 may comprise pattern objects placement or formation unit 8208, mold binder supply unit 8204, and sand supply unit 8206. Controller 8210 may control and coordinate the operation of units 8208, 8204, and 8206 to first place object(s) in the desired locations in mold frame 8202 and then prepare a casting mixture and fill the remaining frame with a mix of sand and binder.

There may be provided a method for forming a mold for additively casting of a metal object. The method may include additively producing multiple production layers, one currently-produced production layer after the other; wherein for each currently-produced production layer: (i) forming one or more mold-layers that comprise at least one removable pattern; (ii) replacing the at least one removable casting pattern by one or more layers of molten metal There may be provided a method for forming a mold for additively casting of a metal object. The method may include (i) preparing a mold-layer comprising at least one removable pattern embedded in the mold-layer; (ii) positioning the mold-layer at a casting location; (iii) casting a molten metal into at least one casting pattern object, removing the at least one embedded removable casting pattern in the mold-layer and replacing it with the molten metal; (iv) repeating steps (i)—(iii) with at least one additional mold-layer, wherein the at least one additional mold-layer may be placed on top of a previous mold-layer.

The at least one of the mold-layers may be formed by sand molding.

The at least one casting pattern may be formed by embedding a pattern object into the mold-layer before or concurrently with the forming of the mold-layer by sand molding.

The at least one pattern object may be made of at least one from the list consisting: loose sand within the hardened sand mold-layer that may be removable by one or more from milling, vibration, gas flow, suction, or other mechanical means, compacted sand that may be mechanically removable by one or more from milling, vibration, gas flow, suction or other mechanical means, binder hardened sand that may be removable by one or more from heating, milling, vibration, gas flow, suction or other mechanical means and a disposable material configured to be evaporated upon casting the molten metal.

The at least one pattern object may be removed from the mold-layer prior to the casting of the cast material.

The at least one pattern object may be removed from the mold-layer by at least one from the list of pattern removal means consisting: heating, milling, vibration, gas flow, suction, or other mechanical means.

The at least one pattern object may be removed from the mold-layer during the casting of the casted material.

The mold-layer may be prepared by filling a mold-layer frame with sand and hardening the sand with a hardening material.

The hardening material may be selected from a list comprising: types of clay, types of silicates, types of resins, and types of oil.

Prior to the filling of the mold-layer frame with sand, positioning the at least one casting pattern object in a pattern object's respective location in the mold-layer frame.

The positioning of the at least one additional mold-layer on top of the previous mold-layer may be done using alignment means comprising recesses and or protrusions.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for casting an object, wherein the method comprises:
   additively producing, by a casting system, multiple production layers, one currently-produced production layer after the other;
   wherein for each currently-produced production layer:
   forming, by a mold system of the casting system, one or more mold-layers;
   providing, by a replaceable material provision system of the casting system, one or more replaceable material layers; and
   forming, by a molten metal processing of the casting system, one or more current object regions of the currently-produced production layer by providing molten metal that replaces the one or more replaceable material layers.

2. The method according to claim 1 comprising removing, by a replaceable material removal system of the casting system, at least one replaceable material layer of the one or more replaceable material layers before a formation of at least one molten metal layer out of one or more molten metal layer that form the one or more current object regions.

3. The method according to claim 2 wherein the removing comprises sucking, by a suction unit, the at least one replaceable material layer.

4. The method according to claim 2 wherein the removing comprises removing the at least one replaceable material layer by a mechanical removal unit.

5. The method according to claim 2 wherein the removing comprises removing the at least one replaceable material layer by a temperature-based removal unit.

6. The method according to claim 2 wherein the removing comprises removing the at least one replaceable material layer by a chemical-based removal unit.

7. The method according to claim 2 wherein the forming the one or more mold-layers comprises providing a mold powder by a mold powder provision system and dispensing a mold binder by a mold binder dispensing system, and the removing comprises removing unbonded mold powder by a mold powder removal system.

8. The method according to claim 2 wherein, for each currently-produced production layer:
   providing one or more current mold powder layers;
   forming one or more current mold regions within each of the one or more current mold powder layers by selectively dispensing particles of one or more binding agents that bond some mold powder particles of the one or more current mold powder layers; and
   removing mold powder particles located within a certain area of each of the one or more current mold powder layers, the certain area is defined by at least some of the one or more current mold regions.

9. The method according to claim 1 wherein the one or more replaceable material layers are decomposable in a presence of the molten metal.

10. The method according to claim 1 comprising generating, by the replaceable material provision system, the one or more replaceable material layers.

11. The method according to claim 1 comprising receiving, by the replaceable material provision system, the one or more replaceable material layers and positioning the one or more replaceable material layers at a casting location.

12. The method according to claim 1 wherein the forming comprises forming the one or more mold-layers by sand molding.

13. The method according to claim 1 wherein the one or more mold-layers are formed with sand and one or more binding agents.

14. The method according to claim 1 wherein the one or more mold-layers are formed with sand and binding agents, wherein at least two of the binding agents differ from each other by their removal process.

15. The method according to claim 1, wherein the forming, by the molten metal processing of the casting system, of the one or more current object regions of the currently-produced production layer comprises depositing molten metal at cavities created in the one or more mold-layers for replacing the one or more replaceable material layers and applying at least one of pre-deposition treatment and post-deposition treatment.

16. The method according to claim 15, wherein the applying at least one of pre-deposition treatment and post-deposition treatment comprises applying at least one of pre-deposition treatment and post-deposition treatment in a local manner.

17. The method according to claim 15 wherein the depositing molten metal at cavities created in the one or more mold-layers comprises depositing the molten metal in at least two cavities created in the one or more mold-layers, and wherein the applying at least one of pre-deposition treatment and post-deposition treatment comprises applying at least one of pre-deposition treatment and post-deposition treatment to said at least two cavities in a spatially distributed manner.

18. The method according to claim 1, comprising performing, by the metal processing system, a heating of an environment of the one or more current object regions of the currently-produced production layer.

19. The method according to claim 1 comprising monitoring, by a monitoring unit, the providing of the one or more replaceable material layers.

20. The method according to claim 19 comprising controlling, by a controller, the providing of the one or more replaceable material layers based on the monitoring.

21. The method according to claim 1, wherein the one or more replaceable material layers are configured to be decomposed at temperatures that exceed 590 degrees Celsius.

22. The method according to claim 1, wherein the one or more replaceable material layers are configured to be decomposed in response to at least one of: (1) heat provided by the molten metal; (2) being in contact with the molten metal; and (3) being in a presence of a molten metal that has started to cool.

23. The method according to claim 1, comprising generating, by a frame system, frame regions that define a frame that encloses the one or more mold-layers.

24. A non-transitory computer readable medium for casting an object, wherein the non-transitory computer readable medium stores instructions for:
   additively producing, by a casting system, multiple production layers, one currently-produced production layer after the other;
   wherein for each currently-produced production layer:
   forming, by a mold system of the casting system, one or more mold-layers;
   providing, by a replaceable material provision system of the casting system, one or more replaceable material layers; and
   forming, by a molten metal processing of the casting system, one or more current object regions of the currently-produced production layer by providing molten metal that replaces the one or more replaceable material layers.

* * * * *